(12) United States Patent
Hardy

(10) Patent No.: US 8,172,099 B1
(45) Date of Patent: May 8, 2012

(54) FIXTURE FOR FORMING DECORATIVE LOOPS FOR FONDANT AND GUM PASTE BOWS

(76) Inventor: Micki L. Hardy, Southlake, TX (US)

( * ) Notice: Subject to any disclaimer, the term of this patent is extended or adjusted under 35 U.S.C. 154(b) by 120 days.

(21) Appl. No.: 12/361,539

(22) Filed: Jan. 28, 2009

(51) Int. Cl.
*A47B 43/00* (2006.01)

(52) U.S. Cl. .................. 211/195; 211/13.1; 211/170

(58) Field of Classification Search ............. 211/1, 13.1, 211/85.2, 85.3, 85.5, 85.9, 16, 30, 38, 61, 211/67, 124, 168, 170, 171, 189, 195, 198, 211/204, 182, 104, 105.1–105.5, 44, 123, 211/105; 248/163.1, 165, 166, 167, 150, 248/214; 242/127, 588, 594.4; D6/467, D6/468

See application file for complete search history.

(56) References Cited

U.S. PATENT DOCUMENTS

| | | | | | |
|---|---|---|---|---|---|
| 201,328 | A | * | 3/1878 | Chamberlin | 482/17 |
| 405,264 | A | * | 6/1889 | Lindsay | 402/4 |
| 529,439 | A | * | 11/1894 | Bent | 211/38 |
| 906,347 | A | * | 12/1908 | Willner | 242/422.5 |
| 1,073,519 | A | * | 9/1913 | Raabe | 242/594.5 |
| 2,135,540 | A | * | 11/1938 | Smith | 242/594.6 |
| D136,476 | S | * | 10/1943 | Tucker | D6/468 |
| 2,940,683 | A | * | 6/1960 | Tauber et al. | 242/127 |
| 3,146,892 | A | * | 9/1964 | Vera White | 211/204 |
| 4,335,840 | A | * | 6/1982 | Williams | 224/315 |
| D270,871 | S | * | 10/1983 | Wright | D3/23 |
| 5,527,242 | A | * | 6/1996 | Gangloff | 482/38 |
| 6,079,572 | A | * | 6/2000 | Irvin | 211/23 |
| 6,340,213 | B1 | * | 1/2002 | Calobrisi, Jr. | 312/244 |
| 6,595,462 | B2 | * | 7/2003 | Lenski et al. | 242/563.2 |
| 6,991,118 | B2 | * | 1/2006 | Phillips | 211/85.3 |
| D532,994 | S | * | 12/2006 | Rice | D6/467 |
| 2005/0103730 | A1 | * | 5/2005 | Hosilyk | 211/85.5 |
| 2006/0091096 | A1 | * | 5/2006 | Velez et al. | 211/194 |
| 2007/0131634 | A1 | * | 6/2007 | Markle et al. | 211/189 |

FOREIGN PATENT DOCUMENTS

GB 2277509 A * 11/1994

* cited by examiner

*Primary Examiner* — Darnell Jayne
*Assistant Examiner* — Stanton L Krycinski
(74) *Attorney, Agent, or Firm* — Mark W. Handley

(57) ABSTRACT

A fixture (12) for forming decorative loops of fondant and gum paste has a support base (14) and two support members (16, 18). The support members (12) are pivotally mounted to opposite, longitudinally disposed ends of the support base (12) for moving from extending horizontally in storage positions to extending vertically in production positions, spaced apart in opposed relation. Apertures (26, 28) extend transversely through the support members (16, 18) and are aligned in registration for receiving forming rods (34, 36) and holding the Forming rods (36, 38) in stationary positions, spaced apart along lengths of the support members (16, 18). In a storage configuration, the support members (16, 18) are folded into horizontally disposed storage positions atop an upper surface of the support base (12), and the forming rods (36, 38) are secured in rod retaining clips (42, 44) mounted to the upper side of the support base (14).

1 Claim, 1 Drawing Sheet

U.S. Patent    May 8, 2012    US 8,172,099 B1
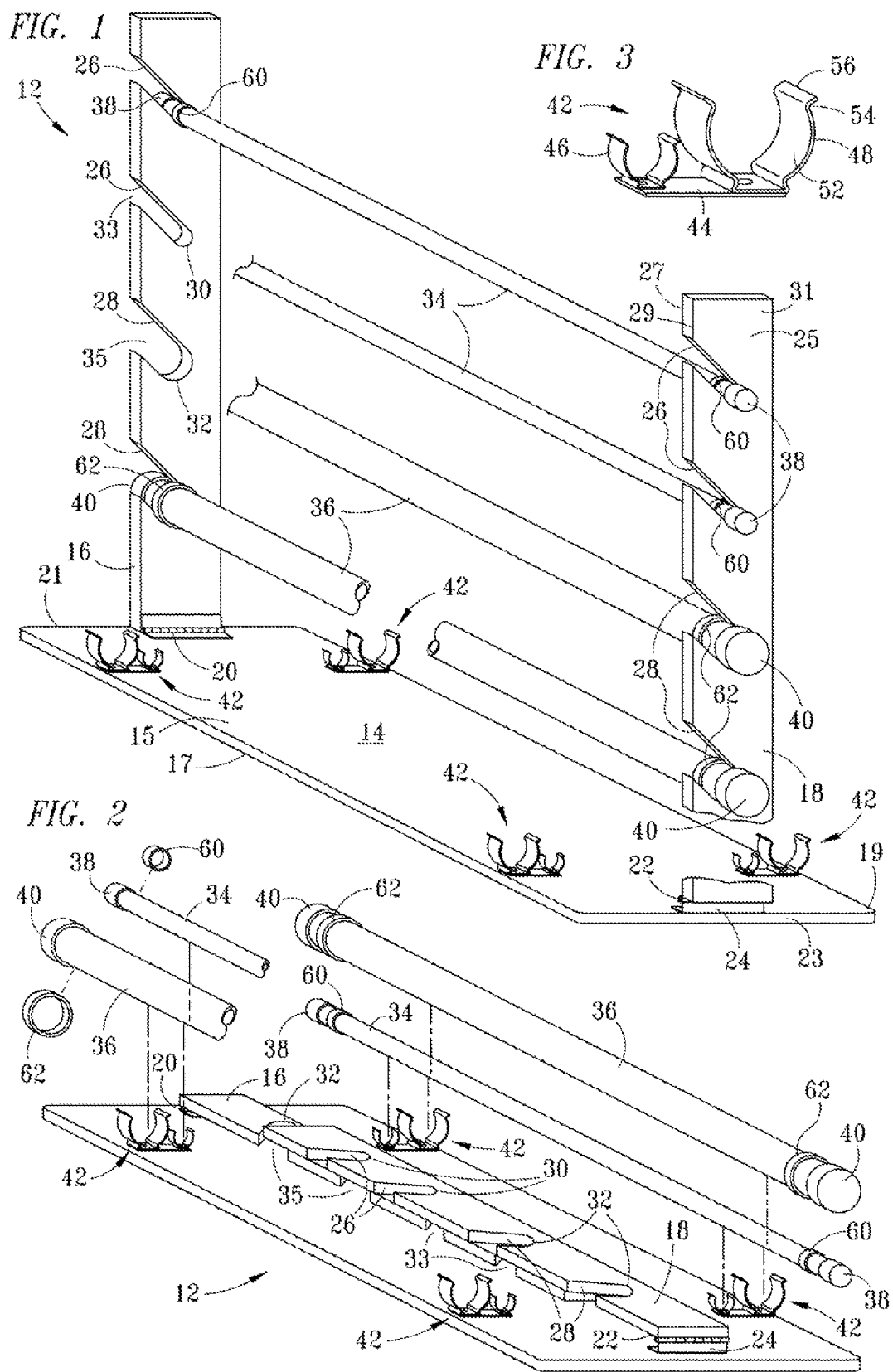

FIXTURE FOR FORMING DECORATIVE LOOPS FOR FONDANT AND GUM PASTE BOWS

TECHNICAL FIELD OF THE INVENTION

The present invention relates in general to equipment for bakeries, and in particular to a fixture for forming decorative loops of edible materials for use in decorating cakes and other baked goods.

BACKGROUND OF THE INVENTION

Decorative loops made of edible materials have been formed of fondant and gum paste, or sugar paste, for use in decorating cakes, pastries, and other bakery items. Prior art rods have been loosely mounted atop various items and then edible strips of fondant and gum paste have been wrapped around the rods to provide the decorative loops. The decorative loops are often assembled into bows and other decorative items. The prior art rods have been provided by broom sticks, mop handles, and similar items. The loose mounting of the prior art rods allows the rods to move causing difficulty in forming the decorative loops. Use of broom sticks, mop handles, and the like, results in unsanitary conditions.

SUMMARY OF THE INVENTION

A fixture for forming decorative loops of edible materials, such as fondant and gum paste, or sugar paste, has a support base and two support members. The support base extends horizontally with two oppositely disposed, longitudinal ends. The fixture is configured with a lower side for laying flat upon a work surface. The two support members are pivotally mounted to respective ones of the oppositely disposed, longitudinal ends of the support base. The support members are raised from horizontally disposed, storage positions to vertically disposed, production positions in which the two support members are spaced apart in opposed relation. The support members have apertures which extend transversely through the sides of the support members, with the apertures extending through front edges of the support members and having closed ends. The apertures of opposed support members are aligned in registration for receiving forming rods. The apertures are preferably configured for receiving forming rods of respective sizes, spaced apart along lengths of the support members. The forming rods are preferably rigid, and when received within the apertures retain the support members in the vertically disposed, production positions. Decorative loops may then be formed on the forming rods with the forming rods held in stationary positions by the support members. The fixture may be disposed in a storage configuration by removing the forming rods from the apertures and folding the support members into storage positions, horizontally disposed atop an upper surface of the support base. Preferably, a first one of the support members will lay flat top the support base and the second support member will lay flat atop the first support member when the fixture is disposed in the storage configuration. The fixture may also be configured to include retaining clips for securing the forming rods directly to the upper side of the support base when not in use.

DESCRIPTION OF THE DRAWINGS

For a more complete understanding of the present invention and the advantages thereof, reference is now made to the following description taken in conjunction with the accompanying Drawings in which FIGS. 1 through 3 show various aspects for a fixture for forming decorative loops of edible materials, such as fondant and gum paste, as set forth below:

FIG. 1 is a perspective view of the fixture for forming decorative loops of fondant and gum paste shown in an assembled, production configuration;

FIG. 2 is a perspective view of the fixture for forming decorative loops shown in a storage configuration, with the support members folded flat into storage positions, and the forming rods shown in exploded positions ready for storage on the fixture; and FIG. 3 is a perspective view of a retaining clip for the retaining the forming rods to the support base during storage of the fixture.

DETAILED DESCRIPTION OF THE INVENTION

FIG. 1 is a perspective view of a fixture 12 for forming decorative loops which provide elements that are assembled to provide edible bows and other decorative items for use in decorating cakes, pastries, and other bakery items. The fixture 12 includes a support base 14 and two support members 16 and 18, with forming rods 34 and 36 extending between the support members 16 and 18. The support base 14 is of a form which is preferably rectangular-shaped, having an upper surface 15 of a planar, rectangular shape, a lower surface 17 of a planar, rectangular shape which extends parallel to the upper surface 15, with corners 19. The support base 14 has two longitudinally disposed opposite ends 21 and 23, and is preferably approximately thirty-six inches in length and twenty inches wide. The support member 16 is mounted on the upper surface 15 at the end 21, and the support member 18 is mounted on the upper surface 15 at the end 23. Preferably, the support member 16 is pivotally mounted by a hinge 20 to the support base 14, and the support member 18 is pivotally mounted by a hinge 22 to support base 14. An offset 24 is provided to dispose the hinge 22 at an elevation above the hinge 20, with the offset 24 being approximately the size of the thickness of the support member 16. The offset 24 is preferably an offset member provided by the mounting plate for the hinge 22 by which the hinge 22 and the support member 18 are secured to the upper surface 15 of the support base 14.

The support members 16 and 18 preferably have longitudinal lengths for extending in vertically aligned positions when the fixture 12 is disposed in a production configuration, and extending in horizontally aligned position when the fixture 12 is disposed in storage configuration. The support members 16 and 18 are preferably each of elongate rectangular shapes, having first and second sides 25 and 27, front edges 29 and rear edges 31. Preferably, the support members 16 and 18 are each approximately thirty inches in length, such that the support members 16 and 18 are able to fold flat atop the support base 14 without extending outward of the support base 14. First portions of the support members 16 and 18 are secured directly to the hinges 20 and 22, and second portions are disposed on opposite longitudinal ends from the first portions. Intermediate portions of the support members 16 and 18 extend between the first and second portions.

A plurality of apertures 26 and 28 extend into intermediate portions of the support members 16 and 18, spaced apart in distally disposed positions within the support members 16 and 18 such that respective ones of the slots 26 and 28 in of the same size are disposed in registration and in opposed relation for receiving respective ones of the forming rods 34 and 36. In the preferred embodiment, the retaining apertures 26 are provided by elongate slots having a closed ends 30 and open ends 31 for receiving respective ones of the forming rods 34, and the retaining apertures 28 are provided by elongate slots having closed ends 32 and open ends 33 for receiving respective ones of the forming rods 36. The apertures 26 and 28 preferably extend into the forward edges 29 of the support members 16 and 18, and are formed to have longitudinal lengths which extend at an angle to the vertical of approximately forty-five degrees, such that respective ones of the forming rods 34 and 36 will drop into the apertures 26 and 28. The formed ends 30 are preferably shaped to match and fitting closely against the outer peripheral shape of the forming rods 34, and the formed ends 32 are preferably shaped to match and fitting closely against the outer peripheral shape of the forming rods 36, such that the forming rods 34 and 36 are removably held firmly in position for forming the decorative loops on the outer peripheral surfaces of the forming rods 34 and 36.

In the preferred embodiment, the forming rods 34 are provided by a quantity of two PVC tubes of a one-half inch nominal diameter, and the forming rods 36 are provided by a quantity of two PVC tubes of a one inch nominal diameter. Other suitable food grade materials may be used for the rods 34 and 36. End caps 38 and 40, such as those formed from PVC, are provided for sealing opposite ends of respective ones of the forming rods 34 and 36 from moisture and debris. The end caps 38 and 40 are removable so that the decorative loops may be easily removed after forming. Preferably, a slight friction fit or interference fit will be provided between the interior diameter of the end caps 38 and 40 and respective ones of the forming rods 34 and 36 to removably retain the end caps 38 and 40 onto the ends of the forming rods 34 and 36. The support base 14 and the support members 16 and 18 are also preferably formed of PVC, or other suitable food grade materials. Bands formed of food grade materials may be provided on the end portions of the forming rods 34 and 36, such as in the form of a tape or sleeve, to provide the friction fit or the interference fit between the end caps 38 and 40 and respective ones of the end caps 38 and 40. Retaining bands 60 and 62 are also provided, preferably of food grade elastomeric materials, for securing around respective ones of the forming rods 34 and 36, spaced apart from the end caps 38 and 40 by approximately the thickness of the support members 16 and 18. The retaining bands 60 and 62 engage against the sides 27 of the support members 16 and 18 to maintain the support members 16 and 18 in upright positions when the fixture 12 is in the production configuration. The retaining bands are preferably one-quarter to one-half inches wide, and of sufficient thickness to prevent the support members 16 and 18 from folding inward on the forming rods 34 and 36. The fixture 12 further has retaining clips 42 and 44 by which corresponding ones of the forming rods 34 and 36 may be secured atop the upper surface of the support base 14 for storage.

FIG. 2 is a perspective view showing fixture in a storage configuration, with the support members 16 and 18 folded in storage positions in which the support member 16 is laying flat atop the upper surface 15 of the support base 14, and the support member 18 is laying flat atop the support member 16. The forming rods 34 and 36 are shown in an exploded position disposed above respective ones of the retaining clips 42 and ready for insertion into the clips 42 to secure the forming rods 34 and 36 to the support base 14 for storage.

FIG. 3 is a perspective view of a storage clip 42 for the retaining the forming rods 34 and 36 to the support base 14 during storage of the fixture 12. The retaining clip 42 has a base portion 44 to which a small clip portion 46 is mounted and a large clip portion 48 is mounted, both of which are of a similar U-shaped configuration having an open end for receiving respective ones of the forming rods 34 and 36. The U-shaped configuration of the clip portions 46 and 48 each have opposed arms 52 which extend to define arcuately shaped sections which are curved for fitting closely against the exterior periphery of the preferably cylindrical exterior shapes of the forming rods 34 and 36. Upper portions of the arms 52 are formed to include retaining sections 54 which fit above respective one of the forming rods 34 and 36 for retaining the forming rods 34 and 36 within respective ones of the clip portions 46 and 48. The upper portions of the arms 52 also include entry sections 56 for guiding the forming rods 34 and 36 into position for passing between the retaining sections 54. The arms 52 are flexible, such that pressure pushing the forming rods 34 and 36 against the retaining sections 54 will spread opposed ones of the arms 52 apart for passing respective ones of the forming rods 34 and 36 into and out of the clip portions 46 and 48. The retaining clip 42 is preferably formed of food grade materials, either metal or plastic, with the clip portions 46 and 48 also preferably formed of resilient food grade materials, such as spring steel or a plastic.

It should be noted that in other embodiments, forming rods 34 and 36 may be retained to support members by support loops sized for receiving the forming rods 34 and 36, as opposed to the apertures 26 and 28. Additionally, the offset 24 may be provided by a joggle (two oppositely facing ninety degree bends) formed into a mounting plate for the hinge 23 which is secured directly to the lower end of the support member 18, a joggle formed into in the lower end of the support member 18, or a mounting block disposed beneath the hinge 22, such that the support member 16 will pivot and lay flat atop the support base 14 and the support member 18 will pivot and lay flat atop the support member 16.

The fixture provides forming rods on which decorative loops of edible materials are formed for use in decorating cakes and other bakery items. The fixture has a support base, two support members, and a plurality of forming rods. The fixture is disposed in a product configuration by placing the support base upon a work surface, and aligning the support members to extend upward from the support base in opposed relation for receiving the forming rods into apertures formed into the two support members. The apertures in opposed ones of the support members are in aligned in registration for receiving respective ones of the forming rods, such that the forming rods are retained in fixed locations for a user to wrap strips of edible materials, such as fondant, gum base paste, or sugar paste, to form the decorative loops. After use, the forming rods are removed from the support members and the support members are folded flat atop a support base to disposed the fixture in a storage configuration. The forming rods are secured to in retaining clips mounted to an upper surface of the fixture for storing the forming rods with the fixture disposed in the storage configuration.

Although the preferred embodiment has been described in detail, it should be understood that various changes, substitutions and alterations can be made therein without departing from the spirit and scope of the invention as defined by the appended claims.

What is claimed is:
1. A fixture for forming decorative loops for decorating bakery items, comprising:
    a support base having a longitudinally extending form having an upper surface, a lower surface which extends substantially parallel to said upper surface, and first and second ends located on opposite sides of said base form which extend between said upper and lower surfaces;

a first support member having a first longitudinally extending shape with a first portion, a first opposite portion disposed longitudinally opposite said first portion, and a first intermediate portion disposed between said first portion and said first opposite portion, and said first support member has first sides and first edges extending between said first sides;

first apertures of elongate shape formed in spaced apart relation into said first support member and extending transversely through said first sides of said first support member, said first apertures having first open ends and first closed ends, said first open ends defined by said first apertures extending through at least one of said first edges in said first intermediate portion of said first support member, and said second closed ends located between said first edges of said first support member;

a first hinge secured to said first portion of said first support member and secured to said first end of said support base, such that said first support member is pivotally secured to said support base for moving between a first support member horizontal position disposed for longitudinally extending substantially parallel to said upper surface of said support base and a first support member vertical position disposed for longitudinally extending substantially perpendicular to said upper surface of said support base;

a second support member having a second longitudinally extending shape with a second portion, a second opposite portion disposed longitudinally opposite said second portion, and a second intermediate portion disposed between said first portion and said first opposite portion, and said second support member has second sides and second edges extending between said second sides, second apertures of elongate shape formed in spaced apart relation into said second support member for registering in opposed relation with said first apertures in said first support member when said first and second support members are vertically disposed to extend from said support base in parallel, said second apertures extending transversely through said second sides of said second support member, and said second apertures having second open ends and second closed ends, with said second open ends defined by said second apertures extending through at least one of said second edges in said second intermediate portion of said second support member, and said second closed ends located between said second edges of said second support member;

a second hinge secured to said second portion of said second support member and secured to said second end of said support base, such that said second support member is pivotally secured to said support base for moving between a second member horizontal position disposed for longitudinally extending parallel to said upper surface of said support base and a second member vertical position disposed for longitudinally extending perpendicular to said upper surface of said support base;

wherein said first and second hinges and said first and second support members are secured to said support base and configured such that said second support member lays flat atop said first support member and said first support member lays flat atop said upper surface of said support base in a storage configuration, and pivotally moving said first and second support members into vertically disposed position, with respective ones of said first and second apertures in opposed registration;

forming rods each having two outer peripheral portions spaced apart for receiving within respective ones of said first and second apertures in opposed registration;

wherein said first hinge for pivotally securing said second support member to said support base has a mounting plate which secures said first hinge and said first support member to said support base, and said mounting plate is formed to provide an offset which spaces said second support member above said support base by a spacing which is approximately a thickness of said first support member;

wherein said first and second apertures are of elongate shape and have open ends formed for receiving said forming rod, closed ends for fitting against said forming rods, with respective ones of said formed ends disposed in positions downward from said open ends at an angle to the vertical;

a plurality of retaining clips mounted to an upper surface of said support base, said retaining clips comprising opposed arms which are formed for receiving and securing said forming rod to said upper surface of said support base;

wherein said forming rods and said first and second apertures are of two different sizes;

end caps removably fitted to ends of said forming rods for removably retaining said end caps to respective ends of said forming rods; and two retaining bands removably secured to each of said forming rods, with said retaining bands spaced apart from respective ones of said end caps by the thicknesses of said first support member and said second support member, with said first support member and said second support member disposed between respective ones of said end caps and said retaining bands.

\* \* \* \* \*